United States Patent
Gritter et al.

(10) Patent No.: US 9,378,225 B2
(45) Date of Patent: Jun. 28, 2016

(54) CORE SERVICE BUILD / DEPLOYMENT FOR HIERARCHICAL DATABASE

(71) Applicant: International Business Machines Corporation, Armonk, NY (US)

(72) Inventors: Daniel S. Gritter, Wappingers Falls, NY (US); Glenn I. Katzen, New York, NY (US); Colette A. Manoni, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 13/960,058

(22) Filed: Aug. 6, 2013

(65) Prior Publication Data

US 2015/0046501 A1 Feb. 12, 2015

(51) Int. Cl.
*G06F 3/048* (2013.01)
*G06F 17/30* (2006.01)

(52) U.S. Cl.
CPC .... *G06F 17/30289* (2013.01); *G06F 17/30194* (2013.01)

(58) Field of Classification Search
CPC G06F 9/524; G06F 17/3089; G06F 17/30194
See application file for complete search history.

(56) References Cited

U.S. PATENT DOCUMENTS

| 8,316,005 | B2 | 11/2012 | Moore | |
|---|---|---|---|---|
| 8,898,127 | B2 * | 11/2014 | Kohno | G06Q 40/02 707/704 |
| 2006/0155705 | A1 * | 7/2006 | Kamper | G06F 17/30067 |
| 2009/0150169 | A1 * | 6/2009 | Kirkwood | G06Q 10/00 705/342 |
| 2010/0017361 | A1 * | 1/2010 | Pan | G06Q 30/0601 705/26.1 |
| 2011/0313972 | A1 * | 12/2011 | Albouze | G06F 17/30575 707/624 |
| 2012/0222016 | A1 | 8/2012 | Pastorelli | |
| 2014/0279846 | A1 * | 9/2014 | Srinivasan | G06F 17/30011 707/608 |
| 2015/0046501 | A1 * | 2/2015 | Gritter | G06F 17/30289 707/805 |
| 2015/0127607 | A1 * | 5/2015 | Savage | G06F 17/30194 707/610 |

* cited by examiner

*Primary Examiner* — Jeffrey A Gaffin
*Assistant Examiner* — Justin Lee
(74) *Attorney, Agent, or Firm* — Patricia B. Feighan; William H. Hartwell

(57) ABSTRACT

A processor-implemented method for designing, developing, implementing and maintaining a core service related to a database is provided. The processor-implemented method may include displaying a graphical user interface and identifying, from the graphical user interface, the core service. Then the processor-implemented method may include determining, from the graphical user interface, a type of folder request based on the identified core service and accessing a folder based on the determining of the type of folder request. The processor-implemented method may further include determining a lock order based on the accessed folder; and manipulating the accessed folder based on the determining of the lock order.

12 Claims, 3 Drawing Sheets

CORE SERVICE BUILD / DEPLOYMENT FOR HIERARCHICAL DATABASE

FIELD OF THE INVENTION

The present invention relates generally to the field of application development and more particularly to database application design.

BACKGROUND

Currently, when designing an application that interacts with a hierarchical database, it is common practice to distribute the application into at least two tiers, which typically includes core services (i.e., the main services of the application) and business logic. Usually, an application programmer is required to develop these separately from the database, using a programming language and other modeling and design tools. However, there are challenges regarding management and interaction of the core services since they are stored separately from the database. With respect to management, core services are typically provided at a lower level than the business logic and there are unique considerations which apply to core services which do not apply to business logic. For example, the core services traditionally interact with the database, and since the core services reside separately from the database, there is the potential for deadlock risks, lock contention, and performance criteria. With respect to interaction, it is common for business logic and core services to blur boundaries since there is no strict interface design. Furthermore, without an interface specifically designed for the core services, it is difficult for the user (i.e., application developer or application programmer) to make changes, update, manage or interact specifically with the core services.

Since in the current environment, core services are typically separate from the database system and the access logic does not reside on the same physical machine as the database, users may experience adverse affects such as performance issues. These performance issues may result from the compounded lock contention and latency that is typically experienced in networked environments. Additionally, since the access points are not restricted, the content of the database is potentially exposed across the network environment and as such there are security risks involved. Furthermore, since the business logic is more computationally expensive, there may be an increase with respect to the architecture costs associated with having the core services residing separately from the business logic.

SUMMARY

A processor-implemented method for designing, developing, implementing and maintaining a core service related to a database is provided. The processor-implemented method may include displaying a graphical user interface and identifying, from the graphical user interface, the core service. Then the processor-implemented method may include determining, from the graphical user interface, a type of folder request based on the identified core service and accessing a folder based on the determining of the type of folder request. The processor-implemented method may further include determining a lock order based on the accessed folder; and manipulating the accessed folder based on the determining of the lock order.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
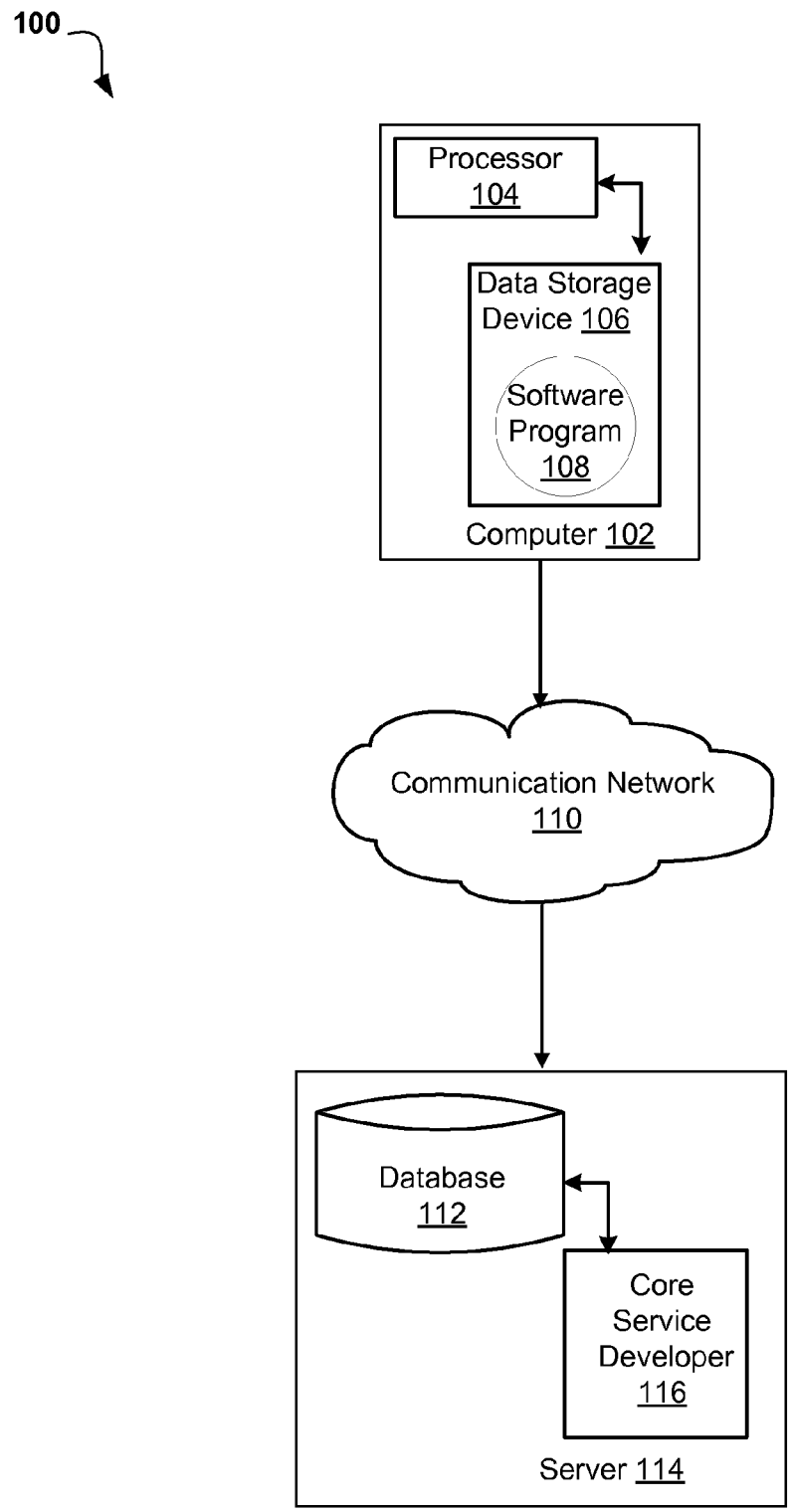
FIG. 1 illustrates the hardware that may be used in a networked computer environment with an exemplary graphical user interface (GUI) to manage, maintain and interact with the core services of a database according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention relates generally to application development, and more particularly to database application design. The following described exemplary embodiments provide a system, method and program product for managing, maintaining and interacting with the core services of a database.

Currently, in database design, the core services are separate from the database system and the access logic does not reside on the same physical machine as the database. As previously described, core services are typically provided at a lower level than the business logic and there are unique considerations which apply to core services which do not apply to business logic. Furthermore, the core services traditionally interact with the database, and since the core services reside separately from the database, there is the potential for deadlock risks, lock contention, and performance criteria. A deadlock may occur when a process or thread enters a waiting state because a resource requested is being held by another waiting process, which in turn is waiting for another resource. For example, an operating system may be trying to read a page from the same thread that is already trying to read the same page. Additionally, since there is not an interface specifically designed for the core services, it is difficult for the user to make changes, update, manage or interact specifically with the core services.

Also, since the access points are not restricted, the content of the database is potentially exposed across the network environment and as such there are security risks involved. Furthermore, since the business logic is more computationally expensive, there may be an increase with respect to the architecture costs associated with having the core services residing separately from the business logic. By allowing the core services to execute on the database platform, where they run optimally and most cost effectively, and the business logic to reside on an external platform, which may be much lower cost than the database system, the developers are able to integrate their application in the most cost effective architecture possible.

Therefore, there exists a need for providing core services that are designed, integrated, and co-located with the database server itself. This may lead to more efficient processing times, reduced lock contention, deadlock elimination, and intuitive design and interface. Furthermore, users may be able to develop core services that do not contain business logic and are easily managed and invoked. Additionally, by allowing the core services to execute on the database platform, where they run optimally and most cost effectively, and the business logic to reside on an external platform, which may be much lower cost than the database system, the developers may be able to integrate their application in the most cost effective architecture possible.

According to at least one embodiment of the present invention, a graphical user interface (GUI) may be utilized by an application developer to implement a core service for a database. As previously described, a core service may be one of the main services of a database application. For example, if the application is a train service application, then a core service of the train service application may be booking a ticket on the train. The core services may be designed, developed, integrated and co-located with the database server itself. As such, this may lead to more efficient processing times, reduced lock contention, deadlock elimination and intuitive design and interface. Furthermore, users may develop core services that do not contain business logic and are easily managed an invoked.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product to provide a GUI that would allow an application developer to implement a core service. Using the method, the core services may be designed, integrated, and co-located with the database server itself, which may lead to more efficient processing times, reduced lock contention, deadlock elimination, and intuitive design and interface. As such, users may be able to develop core services that do not contain business logic and are easily managed and invoked.

Furthermore, another key advantage of providing the user interface (i.e., GUI) is the database system itself is able to "adopt" the core services as functions available from the database system itself. In an environment where performance is critical, integrating the core services as an extension of the database itself may provide some key advantages, such as reduced lock contention. As previously described, integrating the access logic on the same physical machine as the database reduces latency typically seen in networked environments. Another advantage may be higher security. By never exposing the content of the database across a network, access points are restricted to those defined by the developer. Additionally, another advantage may be the cost effectiveness of the architecture. Typically business logic is more computationally expensive and does not need to reside on the same physical machine as the database. By allowing the core services to execute on the database platform, where they run optimally and most cost effectively, and the business logic to reside on an external platform, which may be much lower cost than the database system, this allows developers to integrate their application in the most cost effective architecture possible.

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a server 114 that is enabled to run a core service developer 114 that interacts with a database 112, and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with database 112 running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database.

As previously described, the client computer 102 may access database 112, running on server computer 114 via the communications network 110. For example, a user using an application program 108 running on a client computer 102 may connect via a communication network 110 to database 112 which may be running on server computer 114. Additionally, an application program developer may utilize the core service developer 116 running on server 114 to manage, maintain and interact with the core services of a database 112. The core service developer process is explained in more detail below with respect to FIG. 2.

Figure 2:
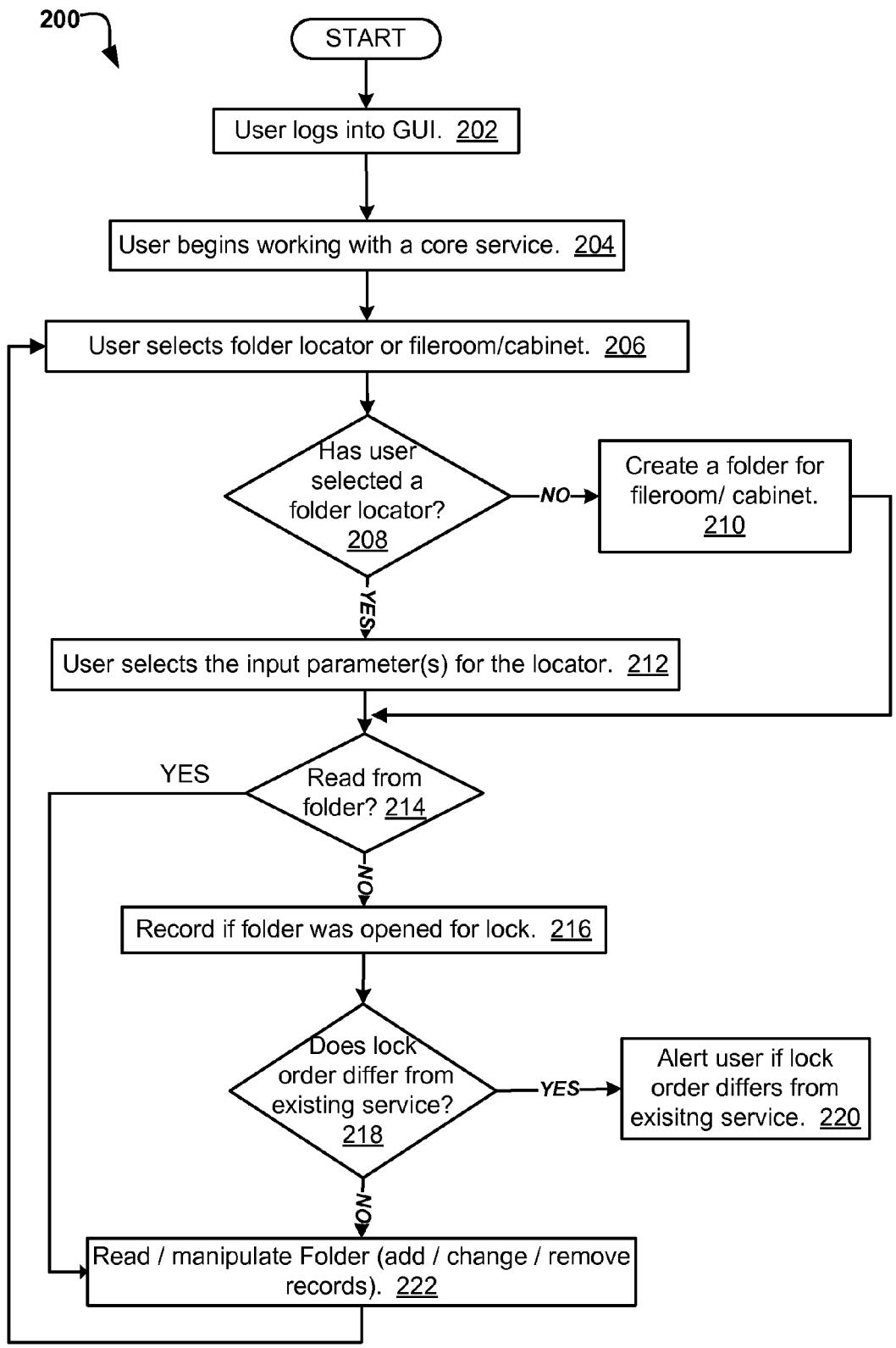
FIG. 2 is an operational flowchart illustrating the steps carried out by a graphical user interface (GUI) to manage maintain and interact with the core services of a database according to one embodiment.

Referring now to FIG. 2, an operational flowchart illustrating the steps carried out by a core service developer to manage maintain and interact with the core services of a database according to one embodiment is depicted. As previously stated, the method may be implemented by providing a user interface (i.e., GUI) that an application developer or programmer (i.e. the user) may utilize to implement a core service. In a hierarchical database, data is stored in related folders, each folder containing one or more records and each record providing zero or more links to a referenced folder. Each folder may be retrieved through a "Folder Locator". Records in a folder may be retrieved using a "Record Locator". Groups of folders are stored in "cabinets" and groups of cabinets are stored in "filerooms".

According to one implementation of the present embodiment, at 202, a user may log into a user interface (i.e., the GUI). Then, at 204, the user may begin working with a core service. The user may begin working with either an existing service or a new service that the user is creating. For example, the user may begin working with a core service for a train service application that is associated with a database relating to the train service data. Next, at 206, the user must select either a defined folder locator or a fileroom or cabinet to work with. For example, the user may be presented with a tree view of the hierarchical stored data with levels consisting of filerooms, cabinets, and folder locators and the user may select which of these the user will be working with. For example, with respect to a train service application, the user may choose to work with a specific folder locator that is associated with the location (i.e., departure station and arrival station) and a date to book a ticket on the train.

Then, at 208, the core service developer 116 (FIG. 1) determines whether the user has selected a defined folder locator. If at 208, it is determined that the user has specified a folder locator, then at 212 the user may select the input parameter(s) for the locator. Each locator may require at least one parameter. The input to these parameters may be chosen by a hard coded value or as an input value. Input values are retrieved from the request, or in an iterative service, from a prior step. With respect to the train service example above, the input parameters may be date and location. In other words, the starting location of the train and the date for the ticket to be used.

Optionally, at 210, the user may be able to specify a fileroom/cabinet, and choose to create a new folder. Then at 214, the requested folder is accessed and the user may decide if a read from the selected folder or an update to the selected folder is to be performed. If a read to the folder is going to be performed, then the user may be allowed to read the records within the folder at 222 or receive an output value from the folder. With respect to the train service example above, if the user wants to count the remaining number of tickets available to be sold and there are not any tickets remaining to be sold, then the user may receive "zero" as the output and the service will end notifying the user that there is no availability on the train. If the user wants to perform a read from the folder, then the user would be able to access the folder and read the data. For example, the user may be able to access the folder and count the number of tickets that are available to be sold.

If at 214 an update to the folder is going to be performed (i.e., no read), then at 216, once a folder is obtained, either through creation or through location, the core service developer 116 (FIG. 1) may record whether the folder was opened for lock (i.e., the lock operation will be added to the list of lock operations to be performed). With respect to the train service example, if there were 10 tickets available to be sold on the train and the user wants to reserve one (i.e., make a change), then at 216 the user would request a lock on that folder to restrict access by other users. Next at 218, the core service developer 116 (FIG. 1), determines whether the lock order matches or differs from the existing service. If the lock order differs from the existing service, then the user is alerted at 220 that the request cannot be performed and the method is completed. Then the user may be notified of the correct lock order and as such, the user may want to re-work their application so it does not conflict with that pre-existing lock order. As such, a deadlock situation was detected and prevented.

However, if at 218, the core service developer 116 (FIG. 1), determines that the lock order does not differ from the existing service, then at 222, the user may be allowed to manipulate records within the folder (i.e., add, change or remove records).

For example, to locate existing records, a user may be presented with the defined record types for the folder. Each field in a record may be used as selection criteria, including the record type and version. Then after a record has been retrieved, the user may update the record using input values, retrieve fields as stored values or output values, or follow a field reference to another folder. Once all records of interest are complete, the user may retain the lock on the folder and proceed to a new folder locator. Once all folders have been closed and the user is finished implementing the core service, the set of output values is displayed as a result set. With respect to the train service example above, the user may wish to change the number of available tickets from 10 to 9 and then the lock would be released from the folder and a response may be returned to the user that one ticket was sold.

As a result, lock scopes and transaction scopes are an important concept as multiple folders may be locked and updated atomically. One major advantage the core service developer provides is maintaining a list of "Lock Patterns". Through the use of the Lock Patterns, the GUI is able to alert the developer to a potential deadlock condition, ensuring the same order or locking is done across all core services.

Figure 3:
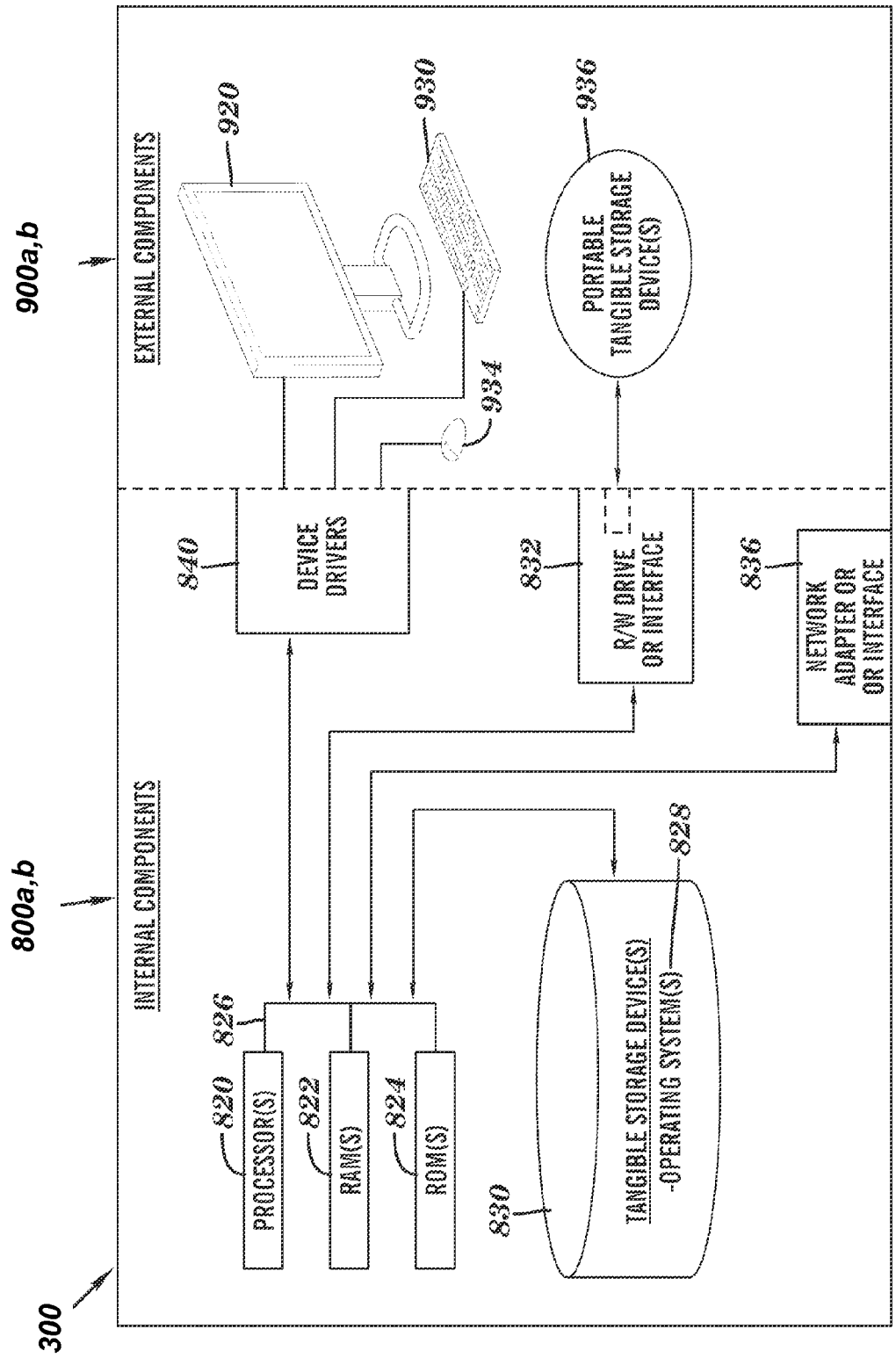
FIG. 3 is a block diagram of internal and external components of computers and servers depicted in FIG. 1.

FIG. 3 is a block diagram of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server computer 114 (FIG. 1) include respective sets of internal components 800 *a, b* and external components 900 *a, b* illustrated in FIG. 3. Each of the sets of internal components 800 *a, b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108 can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless wi-fi interface cards, or 3G or 4G wireless interface cards or other wired or wireless communication links. A software program 108 in client computer 102 can be downloaded to client computer 102 from an external computer via a network (for example, the Internet, a local area network or other, wide area network) and respective network adapters or interfaces 836. From the network adapters or interfaces 836, the software program 108 in client computer 102 is loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A processor-implemented method for designing, developing, implementing and maintaining a core service related to a database, the method comprising:
    displaying, by a processor, a graphical user interface, wherein the displaying of the graphical user interface includes a hierarchical view of stored data relating to the database and wherein the hierarchical view of the stored data includes a plurality of folders, a plurality of filerooms and a plurality of cabinets;
    identifying, from the graphical user interface, the core service;
    prompting, via the graphical user interface, a type of folder request based on the identified core service, wherein the prompted type of folder request comprises a request to access an existing folder including a request for a plurality of input parameters associated with the request to access the existing folder and a request to create a folder in a specified fileroom or a specified cabinet;
    in response to determining the type of folder request is the request to access the existing folder, receiving the plurality of input parameters associated with the request to access the existing folder and accessing the existing folder according to the requested plurality of input parameters;
    in response to determining a plurality of data from the accessed folder matches the plurality of input parameters, retrieving the plurality of data from the accessed folder and displaying the retrieved plurality of data to the user via the graphical user interface;
    in response to determining a plurality of data from the accessed folder does not match the plurality of input parameters, displaying an output value of zero and a notification of no availability to the user via the graphical user interface;
    in response to determining the type of folder request is the request to create the folder in the specified fileroom or the specified cabinet, creating the folder and accessing the created folder;
    determining a lock order based on the accessed folder, wherein determining the lock order comprises recording if the accessed folder was opened for lock and determining if the lock order differs from the identified core service;
    in response to determining the lock order differs from the identified core service, alerting a user that the lock order differs from the identified core service, wherein the alerting comprises notifying the user of a correct lock order associated with the identified core service and notifying the user that the request to access the existing folder cannot be performed; and
    in response to determining the lock order does not differ from the identified core service, manipulating the accessed folder based on the determined lock order.

2. The method of claim 1, wherein the core service is designed, developed, integrated and co-located with the database.

3. The method of claim 1, wherein the determining a type of folder request includes at least one of a folder locator request, a fileroom request and a cabinet request.

4. The method of claim 3, wherein the folder locator request includes an inputting of at least one parameter for the folder locator.

5. The method of claim 1, wherein the manipulating of the accessed folder includes at least one of adding, changing or removing a record.

6. A computer system for designing, developing, implementing and maintaining a core service related to a database, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    displaying a graphical user interface, wherein the displaying of the graphical user interface includes a hierarchical view of stored data relating to the database and wherein the hierarchical view of the stored data includes a plurality of folders, a plurality of filerooms and a plurality of cabinets;
    identifying, from the graphical user interface, the core service;
    prompting, via the graphical user interface, a type of folder request based on the identified core service, wherein the prompted type of folder request comprises a request to access an existing folder including a request for a plurality of input parameters associated with the request to access the existing folder and a request to create a folder in a specified fileroom or a specified cabinet;

in response to determining the type of folder request is the request to access the existing folder, receiving the plurality of input parameters associated with the request to access the existing folder and accessing the existing folder according to the requested plurality of input parameters;

in response to determining a plurality of data from the accessed folder matches the plurality of input parameters, retrieving the plurality of data from the accessed folder and displaying the retrieved plurality of data to the user via the graphical user interface;

in response to determining a plurality of data from the accessed folder does not match the plurality of input parameters, displaying an output value of zero and a notification of no availability to the user via the graphical user interface;

in response to determining the type of folder request is the request to create the folder in the specified fileroom or the specified cabinet, creating the folder and accessing the created folder;

determining a lock order based on the accessed folder, wherein determining the lock order comprises recording if the accessed folder was opened for lock and determining if the lock order differs from the identified core service;

in response to determining the lock order differs from the identified core service, alerting a user that the lock order differs from the identified core service, wherein the alerting comprises notifying the user of a correct lock order associated with the identified core service and notifying the user that the request to access the existing folder cannot be performed; and in response to determining the lock order does not differ from the identified core service, manipulating the accessed folder based on the determined lock order.

7. The computer system of claim 6, wherein the core service is designed, developed, integrated and co-located with the database.

8. The computer system of claim 6, wherein the determining a type of folder request includes at least one of a folder locator request, a fileroom request and a cabinet request.

9. The computer system of claim 8, wherein the folder locator request includes an inputting of at least one parameter for the folder locator.

10. The computer system of claim 6, wherein the manipulating of the accessed folder includes at least one of adding, changing or removing a record.

11. A computer program product for designing, developing, implementing and maintaining a core service related to a database, the computer program product comprising:

one or more non-transitory computer-readable storage devices and program instructions stored on at least one of the one or more tangible storage devices, the program instructions executable by a processor, the program instructions comprising:

program instructions to display a graphical user interface, wherein the displaying of the graphical user interface includes a hierarchical view of stored data relating to the database and wherein the hierarchical view of the stored data includes a plurality of folders, a plurality of filerooms and a plurality of cabinets;

program instructions to identify, from the graphical user interface, the core service;

program instructions to prompt, via the graphical user interface, a type of folder request based on the identified core service, wherein the prompted type of folder request comprises a request to access an existing folder including a request for a plurality of input parameters associated with the request to access the existing folder and a request to create a folder in a specified fileroom or a specified cabinet;

in response to determining the type of folder request is the request to access the existing folder, program instructions to receive the plurality of input parameters associated with the request to access the existing folder and program instructions to access the existing folder according to the requested plurality of input parameters;

in response to determining a plurality of data from the accessed folder matches the plurality of input parameters, program instructions to retrieve the plurality of data from the accessed folder and program instructions to display the retrieved plurality of data to the user via the graphical user interface;

in response to determining a plurality of data from the accessed folder does not match the plurality of input parameters, program instructions to display an output value of zero and a notification of no availability to the user via the graphical user interface;

in response to determining the type of folder request is the request to create the folder in the specified fileroom or the specified cabinet, program instructions to create the folder and access the created folder;

program instructions to determine a lock order based on the accessed folder, wherein determining the lock order comprises recording if the accessed folder was opened for lock and determining if the lock order differs from the identified core service;

in response to determining the lock order differs from the identified core service, program instructions to alert a user that the lock order differs from the identified core service wherein the alerting comprises notifying the user of a correct lock order associated with the identified core service and notifying the user that the request to access the existing folder cannot be performed; and in response to determining the lock order does not differ from the identified core service, program instructions to manipulate the accessed folder based on the determined lock order.

12. The computer program product of claim 11, wherein the core service is designed, developed, integrated and co-located with the database.

* * * * *